Dec. 11, 1945.　　O. A. ABRAMS ET AL　　2,390,632
FITTING INSULATING COVER
Filed May 16, 1942
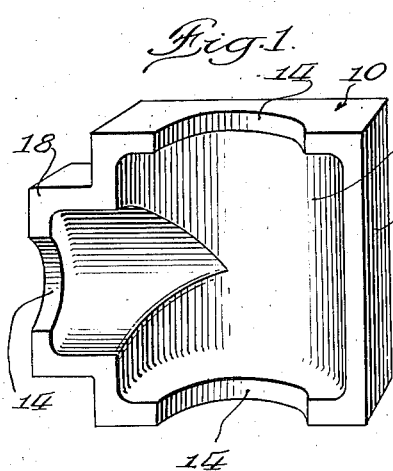
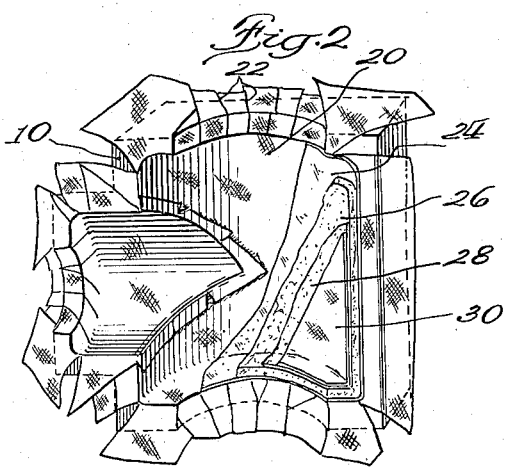
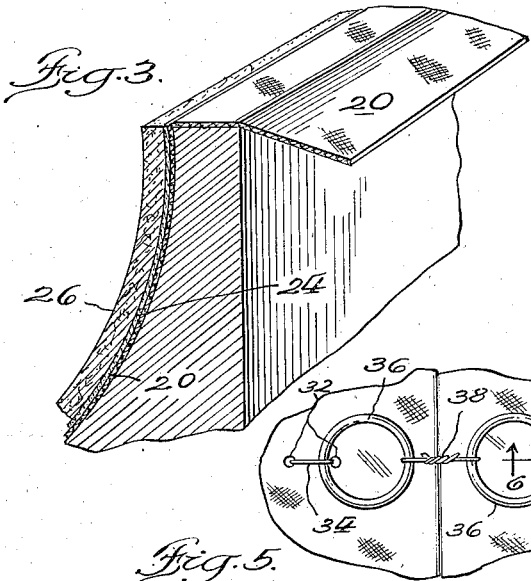
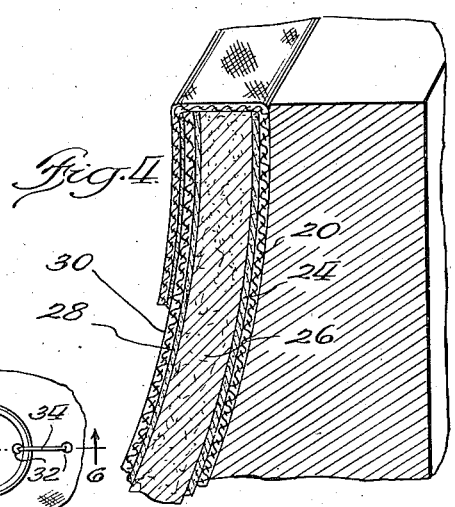
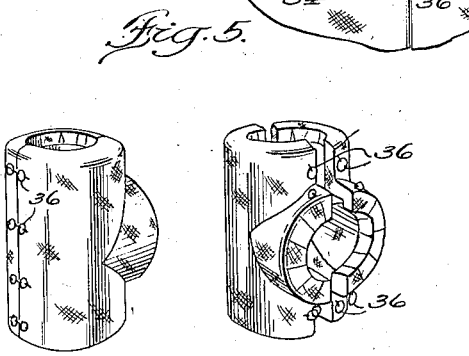
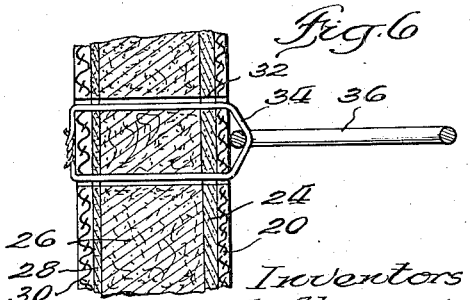
Inventors
Oliver A. Abrams
Otto Schubert
By Williams, Bradbury & Hinkle
Attys Patented Dec. 11, 1945

2,390,632

UNITED STATES PATENT OFFICE 2,390,632

FITTING INSULATING COVER

Oliver A. Abrams and Otto Schubert, Portland, Oreg., assignors to The E. J. Bartells Company, Seattle, Wash., a corporation of Washington Application May 16, 1942, Serial No. 443,322

7 Claims. (Cl. 154—28)

The present invention relates to fitting insulating covers and is more particularly concerned with the provision of covers formed of heat insulating material which are adapted to be placed around pipe fittings of irregular shape, such as T's, elbows, crosses, valves and the like, so as to prevent heat transfer to or from the fitting so insulated.

In the past it has been common practice to insulate straight steam lines, for instance, by means of preformed pipe covering sections which are placed around the reaches of pipe and are held in place by bands or other securing means so as to insulate the pipes. Wherever two or more pipes join each other, or wherever valves are placed, the object to be insulated is of larger diameter and is frequently of a somewhat complicated configuration. Such sections placed at the juncture of two or more pipes are commonly referred to as pipe-fittings. For the present purpose, valve bodies will also be referred to as pipe fittings since they are similarly treated in carrying out the present invention.

In the art of insulating pipe, these fittings are usually covered by hand by a skilled operator working on the job after the pipes are installed. In other words, each fitting is treated separately and as can be well appreciated, the appearance of fitting covers enclosing identical fittings is seldom alike since the work as has been pointed out above, is hand done. This work is also rather expensive, inasmuch as a skilled workman is required, and since it takes considerable time to construct each of the fitting covers. It will be appreciated further that these hand made covers cannot be removed and replaced since they are destroyed during removal.

The present invention provides a fitting cover and a method for forming such a fitting cover whereby the covers can be prefabricated in a shop and taken to the job and installed by unskilled workmen in a minimum of time. It is, therefore, one of the objects of the present invention to provide a novel prefabricated fitting cover and a novel method for forming such a fitting cover.

Another object of the present invention is to provide a novel fitting cover that can be prefabricated and which can be quickly applied to the fitting to be covered by unskilled labor and which, so far as the eye can detect, will be substantially identical to all other fitting covers applied to fittings of a similar type.

Still another object of the present invention is to provide a novel fitting cover which can be applied to a pipe fitting and which when applied will give a much neater appearance than fitting covers formed on the job.

Still another object of the present invention is to provide a novel fitting cover that can be readily removed or replaced without damage and loss of efficiency.

Yet another object of the present invention is to provide an improved fitting cover by the use of which pipe fittings can be covered at greatly reduced cost.

Other objects and advantages will appear from the following description of a preferred embodiment of the present invention, taken in conjunction with the accompanying drawing, in which Fig. 1 is a perspective view of a mold within which a fitting cover for a pipe T is formed according to the present method;

Fig. 2 is a perspective view showing several steps in the formation of such a fitting cover;

Fig. 3 is a perspective sectional view of a portion of the mold drawn to larger scale than Figs. 1 and 2 and taken at one stage during the formation of the fitting cover of the present invention;

Fig. 4 is a view similar to Fig. 3, taken at a later stage during the formation of a fitting cover according to the present process;

Fig. 5 is a fractional plan view of a portion of a fitting cover illustrating the method of securing the cover in position about a pipe fitting;

Fig. 6 is a transverse sectional view which may be considered as taken in the direction of the arrows substantially along the line 6—6 of Fig. 5;

Fig. 7 is a perspective view of a completed fitting cover adapted for enclosing a pipe T shown before being fixed in place about a pipe fitting; and Fig. 8 is a perspective view of the fitting cover shown in Fig. 7 with the two halves thereof secured together in the positions they will assume when enclosing a pipe T.

In order to form fitting covers according to the present invention, a boxlike mold 10 is formed. Within this mold a portion of the fitting cover is built up, that is, all of the fitting covers constructed according to the present invention are formed in at least two pieces. In many instances, these pieces will be alike, in which case only one mold need be used to form both of the halves. In some instances, when covers are to be made for more complicated irregular shaped fittings, the cover will comprise more than two pieces. The process of making several pieces, however, is substantially the same as is here illustrated in connection with the manufacture of a cover for a pipe T.

The mold 10 may be made of wood or any suitable material and has formed therein a depression 12 having the contour of a portion, in the present instance one-half, of the external shape of the completed fitting cover. This mold can be made in any suitable manner, for instance, a pipe T or other pipe fitting of the type to be covered can be coated with plaster or some similar substance to build up the pipe fitting to the contour it will have when covered, so that the plastered fitting will have substantially the same appearance as the fitting will have when enclosed with one of the insulating covers of the present invention. If desired, of course, such a dummy can be built entirely of plaster or some other plastic substance. The mold is then routed out or otherwise shaped to conform substantially to the external surface of the plaster dummy. It will be appreciated that a wooden mold, such as shown in Fig. 1 and indicated by the numeral 10, can be formed in other manners, the scheme above described being given for purposes of illustration only.

Wherever a pipe will join the fitting of the type to be enclosed in the cover to be made in the mold 10, the mold is provided with cut-away portions having approximately the same curvature as the pipes to be joined to the fitting. These cut-away portions are indicated by the numeral 14. If desired, the mold 10 can be made adjustable. That is, different portions of this mold can be formed as separate pieces which are secured together by dowels, clamps, or other suitable means so that these separate pieces can be assembled with other pieces to form a mold in which fitting covers of different types are to be made. For instance, the side wall 16 to the right of Fig. 1 can be made as a separate piece so that it can be removed and replaced by a side wall such as the one shown to the left in Fig. 1, and indicated by the numeral 18, thus making the mold useful for forming covers for crosses, for instance. The user of the present invention can avail himself of this expedient for making the molds in parts which are interchangeable with other parts or not, as he so desires, the invention being concerned more with the fitting cover and the method of forming the fitting cover than with the particular construction of the mold used.

After the mold 10 has been provided, an operator lays asbestos cloth 20 in place as shown in Fig. 2. With most types of fitting covers, at least two pieces of asbestos cloth will be required since the curvature of the outside of the cover is compound. That is, in the present illustration, one piece of cloth is used to cover the large generally cylindrical surface to the right in Fig. 1, while another piece will cover the cylindrical surface extending at right angles to the left in Fig. 1. The two pieces are secured together by means of any suitable adhesive, such as a silicate of soda adhesive, for instance.

The asbestos cloth extends over the edge of the mold and as shown in Fig. 2, wherever necessary slits 22 are formed in the cloth in order to make the cloth take the proper contour. This cloth is pressed into place within the mold by means of curved wooden blocks or other suitable tools so that it rests in close contact with the mold surface.

The inner surface of the cloth is then coated with a comparatively thin layer of casting plaster 24. This plaster insures the external surface of the cover being smooth and helps the fitting cover to retain its shape and gives it strength and rigidity.

After the casting plaster is in place, a desired thickness of fibrous asbestos blanketing material 26 is placed on top of the plaster and pressed into place. This fibrous asbestos is then coated with a mixture of silicate of soda and 85% magnesium cement 28. Another sheet of asbestos cloth 30 is then secured by this cement to the inside of the blanket to provide a neat finish, the portions of the asbestos cloth covering 20 which project from the sides of the mold then being folded over and cemented into place against the asbestos cloth lining 30 as shown in Fig. 4. The article is then removed from the mold and allowed to dry at room temperature, the casting plaster hardening and setting during this drying step.

The article thus produced comprises half of a T fitting cover. A second half is made exactly like the first. These two cover elements, when dried, are punched at intervals along the edges to form holes 32 through which copper wires 34 are inserted. These wires pass through rings 36 and are twisted or tied together along the inner surface of the mold cover to secure the rings 36 in position adjacent the edges of each piece of the mold cover, the rings being arranged in pairs opposite each other on the two or more cover pieces. The fitting covers in this form are then sent to the job where the separate parts of each cover are located in assembled relation around the fitting and held in place while wires 38 are passed through adjacent rings 36 and twisted together to secure the fitting covers tightly in place as shown in Figs. 5 and 8, or if desired, the rings can be connected by lacing them with wire much in the manner shoes are laced.

Covers constructed in the above described manner are smooth and present a neat appearance. They are also sufficiently rigid and strong to retain their shape and not become easily damaged in use. They can be manufactured quickly and at low cost in a shop and can in fact be manufactured in advance of the actual installation of the piping in a ship or building or the like, thus expediting finishing the job after the piping is in place. Further, these covers can be installed by unskilled labor in much less time than it takes to install pipe fitting covers in the usual manner by skilled workmen. Also it will be appreciated that simply by cutting the wires 38, which connect the rings 36, the fitting covers can be removed at any time without damage. The covers can then be re-installed on the same fittings or on other fittings of a similar type.

Although the present invention has been described in connection with the manufacture of a cover specially constructed to enclose a T pipe fitting, it will be appreciated that by the use of different molds, the contours of which will suggest themselves to anyone skilled in the art, fittings can be made for enclosing flanges, valves, bonnets, crosses, L's, Y's or the like, and even members of larger and more irregular configuration.

It will be appreciated further that, although the specific fitting cover described is comprised of materials especially adapted for insulating steam line fittings or other fittings which carry gases or liquids at a temperature above the circumambient temperature, the invention is not limited to such use nor to such materials. As an example, canvas, burlap, muslin, or other suitable materials can be used in place of the asbestos cloth where the temperatures encountered permit their use. Likewise, cement, refractory or other suitable substances can similarly be used in place of the casting plaster. Also, other suitable insulating materials, such as granulated cork or fibrous glass may be used in place of the fibrous asbestos, particularly for insulating fittings in refrigerating lines. Similarly, other adhesives besides silicate of soda and 85% magnesium cement can be used. As an example, in the manufacture of fittings for insulating refrigerator lines, an asphaltum preparation would be suitable. It will be understood further that where in the specification or claims the term "heat insulating material" or its equivalent is used, this phrase is used in its broad sense and refers to a material which inhibits the transfer of heat in either direction, that is, it prevents the escape of heat from a line or it prevents the entrance of heat from the outside into the line.

Having described the present invention, what is claimed as new and useful and desired to secure by Letters Patent of the United States is:

1. The method of forming fitting insulating covers adapted to be used on fittings of irregular shape which comprises providing a mold with a cavity therein having the countour of the external surface of the portion of such a fitting cover it is desired to construct in one piece, lining said mold with woven asbestos cloth, coating said asbestos cloth on the inside thereof with casting plaster, placing an insulating blanket against the inner surface of said plaster, coating said insulating blanket with silicate of soda and magnesium cement, bringing a sheet of woven asbestos cloth into contact with said cement, and drying the article thus produced and simultaneously setting and hardening said casting plaster.

2. A preformed fitting insulating cover adapted to be used on fittings of irregular shape comprising a plurality of complementary sections, each of said sections comprising two spaced apart sheets of woven asbestos cloth, the outer of said sheets being supported by a shaped lining of hardened casting plaster adhering to the inner surface thereof, and a blanket of heat insulating material located between said plaster lining and the inner of said sheets.

3. A fitting insulating cover segment adapted to be used on fittings of irregular shape comprising a sheet of asbestos cloth, a lining of hardened plaster placed against the inner surface of said cloth, said plaster being located against the inner surface of said cloth to support said cloth permanently in a predetermined shape, a heat insulating blanket located against the inner surface of said plaster, a heat resisting cement located on the inner side of said blanket, and an asbestos cloth liner secured by said cement to said blanket.

4. The method of forming insulating coverings for pipe fittings or similar objects of irregular shape which comprises preparing a dummy having substantially the same outer contour it is desired to have in the completely insulated fitting, providing a mold to fit a portion of said dummy, locating a sheet of fabric material in place within said mold, forming a layer of a hardenable initially moldable strengthening material against the inner surface of said sheet, placing an insulating blanket against the inner surface of the moldable material, cementing another sheet of fabric material to the inner surface of said blanket, cementing portions of one of said sheets to the other of said sheets to give finished edges, and drying the article thus produced and simultaneously setting and hardening said moldable material.

5. The method of forming insulating coverings for pipe fittings of irregular shape which comprises preparing a dummy having substantially the same outer contour it is desired to have in the completely insulated fitting, a providing a mold to fit a portion of said dummy, locating a sheet of fabric material in place within said mold, forming a layer of hardenable initially moldable strengthening material against the inner surface of said sheet, placing a layer of insulating material against the inner surface of said strengthening material, cementing another sheet of fabric material to the inner surface of said insulating material, and cementing portions of one of said sheets to the other of said sheets to give finished edges.

6. A fitting insulating cover segment adapted to be used with fittings of irregular shape comprising a sheet of asbestos cloth, a lining of hardened initially moldable shape retaining material against the inner surface of said cloth, heat insulating material located against the inner surface of said shape retaining material, a heat resisting cement located on the inner surface of said heat insulating material, and an asbestos cloth liner secured by said cement to said heat insulating material.

7. The method of forming fitting insulating covers adapted to be used on fittings of irregular shape which comprises providing a mold with a cavity therein having the contour of the external surface of the portion of such a fitting cover it is desired to construct in one piece, lining said mold with a fabric material, coating said fabric material on the inside thereof with a hardenable initially moldable shape retaining material, placing insulating material against the inner surface of said moldable material, cementing a sheet of fabric material against said insulating material, and drying the article thus produced and simultaneously setting and hardening said moldable material.

OLIVER A. ABRAMS.
OTTO SCHUBERT.